US012727068B1

(12) United States Patent
Tang et al.

(10) Patent No.: US 12,727,068 B1
(45) Date of Patent: Sep. 1, 2026

(54) SINGLE BUTTON COLOR-ADJUSTABLE AND DIMMABLE LED LIGHTING DEVICE

(71) Applicant: Edison Opto Corporation, New Taipei City (TW)

(72) Inventors: Po-Jen Tang, New Taipei City (TW); Hsuan-Chung Chen, New Taipei City (TW); Kun-Tien Ho, New Taipei City (TW)

(73) Assignee: Edison Opto Corporation, New Taipei City (TW)

( * ) Notice: Subject to any disclaimer, the term of this patent is extended or adjusted under 35 U.S.C. 154(b) by 0 days.

(21) Appl. No.: 19/201,913

(22) Filed: May 8, 2025

(30) Foreign Application Priority Data

Feb. 28, 2025 (CN) ......................... 202520337831.1

(51) Int. Cl.
*H05B 45/10* (2020.01)
*H05B 45/20* (2020.01)
*H05B 45/325* (2020.01)
*H05B 45/345* (2020.01)

(52) U.S. Cl.
CPC ........... *H05B 45/325* (2020.01); *H05B 45/10* (2020.01); *H05B 45/20* (2020.01); *H05B 45/345* (2020.01)

(58) Field of Classification Search
CPC ........ H05B 45/10; H05B 45/20; H05B 45/30; H05B 45/325; H05B 45/345; H05B 47/10
See application file for complete search history.

(56) References Cited

U.S. PATENT DOCUMENTS

| | | | | |
|---|---|---|---|---|
| 3,643,199 | A | 2/1972 | Tanaka | |
| 4,363,018 | A | 12/1982 | Matsui et al. | |
| 4,463,233 | A | 7/1984 | Tanabe | |
| 2012/0242247 | A1 | 9/2012 | Hartmann et al. | |
| 2019/0230760 | A1 * | 7/2019 | Li | H05B 45/20 |
| 2021/0144818 | A1 | 5/2021 | Rodriguez | |

FOREIGN PATENT DOCUMENTS

| | | | |
|---|---|---|---|
| CN | 105657932 | A | 6/2016 |
| CN | 218162941 | U | 12/2022 |
| TW | M524018 | U | 6/2016 |

* cited by examiner

*Primary Examiner* — Jimmy T Vu
(74) *Attorney, Agent, or Firm* — CKC & Partners Co., LLC

(57) ABSTRACT

A single button color-adjustable and dimmable LED lighting device includes a control board, a button knob assembly, and a light-emitting module. The control board has an MCU control circuit having a variable resistor and a switch. The button knob switch is disposed on the control board and electrically connected to the MCU control circuit. The light-emitting module has a first pulse-width modulation (PWM) control constant current circuit, a second PWM control constant current circuit, a first LED, and a second LED. The MCU control circuit is configured to generate two corresponding PWM signals based on the resistance value of the variable resistor and the state of the switch to respectively control an output current for the first LED and an output current for the second LED, such that the light-emitting module emits light with different brightness or different color temperatures.

15 Claims, 10 Drawing Sheets

100

SINGLE BUTTON COLOR-ADJUSTABLE AND DIMMABLE LED LIGHTING DEVICE

CROSS-REFERENCE TO RELATED APPLICATION

This application claims priority to China Application Serial Number 202520337831.1, filed Feb. 28, 2025, which is herein incorporated by reference.

BACKGROUND

Field of Invention

The present disclosure relates to a single button color-adjustable and dimmable lighting device, especially relates to a single button color-adjustable and dimmable LED lighting device.

Description of Related Art

Light-emitting diode (LED) lamps have the characteristics of energy-saving, environmental protection, soft and uniform light, and various colors, and are deeply loved by consumers. With the development of LED technology, more and more types of lamps use LEDs as light sources. Generally speaking, an LED can change its brightness by changing the intensity of the current passing through it. For example, the greater the current passing through the LED, the higher the brightness, and the smaller the current passing through the LED, the darker the brightness. However, as consumers' needs become more and more diversified, conventional designs that can only adjust the brightness of lamps are no longer sufficient.

Although there are already dimmable lighting devices on the market, for example, a microcontroller unit (MCU) is connected to a rotary encoder, so that the MCU can determine the rotation direction of the rotary encoder based on the phase difference between the two sets of signals generated by the rotary encoder. However, the rotary encoder designed in this way requires three contact pins of the MCU, and the pin connected to one set of the signals must have an interrupt function in order to correctly determine the direction. In addition, the rotary encoder itself is designed to rotate infinitely in the same direction. Unless the user directly looks at the light to judge, the user will not know whether the current brightness has reached the brightest level or the darkest level.

SUMMARY

According to some embodiments of the present disclosure, a single button color-adjustable and dimmable LED lighting device includes a control board, a button knob assembly, and a light-emitting module. The control board has a microcontroller unit (MCU) control circuit, wherein the MCU control circuit has a variable resistor and a switch. The button knob assembly is disposed on the control board and electrically connected to the MCU control circuit. The light-emitting module has a first pulse-width modulation (PWM) control constant current circuit, a second PWM control constant current circuit, a first light-emitting diode (LED), and a second LED. The first PWM control constant current circuit is electrically connected to the MCU control circuit and the first LED, and the second PWM control constant current circuit is electrically connected to the MCU control circuit and the second LED. A color temperature of the first LED is different from a color temperature of the second LED. The MCU control circuit is configured to generate two corresponding PWM signals based on a resistance value of the variable resistor and a state of the switch to respectively control an output current for the first LED and an output current for the second LED, such that the light-emitting module emits light with different brightness or different color temperatures.

In some embodiments, the button knob assembly includes a rotary shaft and a knob. The rotary shaft is connected to the variable resistor and the switch. The knob is fixed to the rotary shaft, configured to be pressed or pulled out, and configured to rotate. The switch is in a first state when the knob is clicked briefly or pulled out briefly. The switch is in a second state when the knob is pressed continuously or pulled out continuously.

In some embodiments, when the switch is in the first state and the knob is rotated, the two PWM signals are configured to adjust brightness of an entirety of the first LED and the second LED.

In some embodiments, when the switch is in the second state and the knob is rotated, the two PWM signals are configured to adjust brightness of an entirety of the first LED and the second LED.

In some embodiments, when the switch is in the second state and the knob is rotated, the two PWM signals are configured to adjust a color temperature of an entirety of the first LED and the second LED.

In some embodiments, when the switch is in the first state and the knob is rotated, the two PWM signals are configured to adjust a color temperature of an entirety of the first LED and the second LED.

In some embodiments, when the knob is clicked briefly or pulled out briefly, the MCU control circuit is configured to change the light-emitting module from a light-on state to a light-off state, or from a light-off state to a light-on state.

In some embodiments, when the knob is pressed continuously or pulled out continuously, the MCU control circuit is configured to change the light-emitting module from a light-on state to a light-off state, or from a light-off state to a light-on state.

In some embodiments, the two PWM signals are configured to adjust pulse-on time to increase or decrease the output current for the first LED and the output current for the second LED, thereby changing brightness of light emitted from the light-emitting module.

In some embodiments, the two PWM signals are configured to adjust pulse-on time to change the output current for the first LED and the output current for the second LED, thereby changing a color temperature of light emitted from the light-emitting module.

In some embodiments, a color temperature of the first LED is in a range from 2500K to 3500K, and a color temperature of the second LED is in a range from 5500K to 6500K.

In some embodiments, the light-emitting module is configured to emit light with a color temperature in a range from 2700K to 6500K.

In some embodiments, the control board further includes an electromagnetic interference (EMI) protection circuit, a rectifier filter circuit, and a DC constant voltage power supply circuit. The EMI protection circuit is electrically connected to a power source. The rectifier filter circuit is electrically connected to the EMI protection circuit, the first PWM control constant current circuit, and the second PWM control constant current circuit. The DC constant voltage power supply circuit is electrically connected to the rectifier filter circuit and the MCU control circuit.

In some embodiments, the MCU control circuit is configured to memorize and restore a state of the light-emitting module before power is off.

In the aforementioned embodiments of the present disclosure, since the single button color-adjustable and dimmable LED lighting device has the button knob assembly disposed on the control board, and the MCU control circuit has the variable resistor and the switch, and the light-emitting module has the first PWM control constant current circuit electrically connected to the MCU control circuit and the first LED and has the second PWM control constant current circuit electrically connected to the MCU control circuit and the second LED, the user can operate the button knob assembly to enable the MCU control circuit to generate two corresponding PWM signals based on the resistance value of the variable resistor and the state of the switch when the single button color-adjustable and dimmable LED lighting device is in use. As a result, the output current passing through the first LED and the output current passing through the second LED can be controlled to realize the adjustments of the brightness and the color temperature of the light-emitting module.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
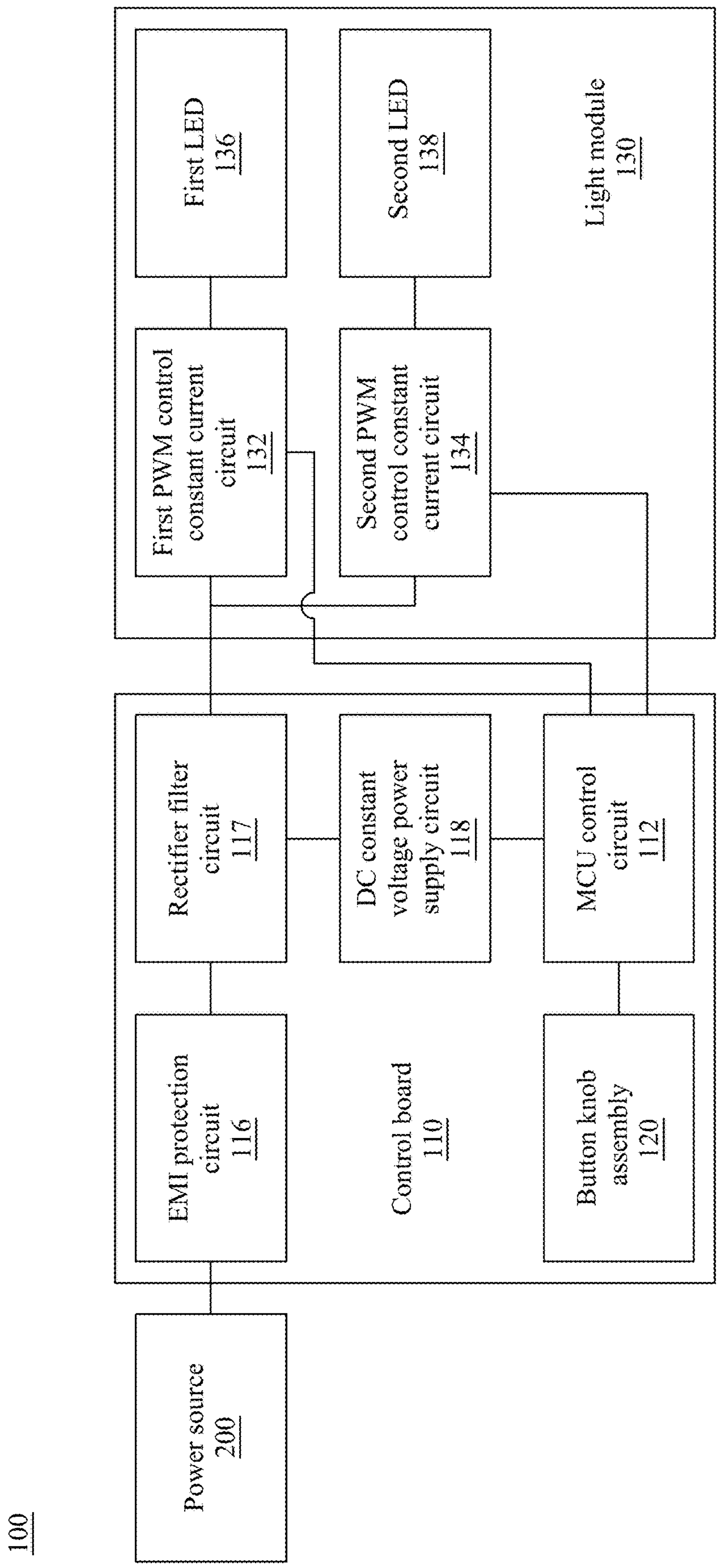
FIG. 1 is a block diagram of a single button color-adjustable and dimmable LED lighting device according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a block diagram of a single button color-adjustable and dimmable LED lighting device 100 according to one embodiment of the present disclosure. The single button color-adjustable and dimmable LED lighting device 100 includes a control board 110, a button knob assembly 120, and a light-emitting module 130. The control board 110 has a microcontroller unit (MCU) control circuit 112. The button knob assembly 120 is disposed on the control board 110 and electrically connected to the MCU control circuit 112. The light-emitting module 130 is located outside and separated from the control board 110, and has a first pulse-width modulation (PWM) control constant current circuit 132, a second PWM control constant current circuit 134, a first light-emitting diode (LED) 136, and a second LED 138. The number of the first LEDs 136 and the number of the second LEDs 138 may be multiple, and the present disclosure is not limited in this regard. The first PWM control constant current circuit 132 is electrically connected to the MCU control circuit 112 and the first LED 136. The second PWM control constant current circuit 134 is electrically connected to the MCU control circuit 112 and the second LED 138.

The color temperature of the first LED 136 is different from the color temperature of the second LED 138. For example, the first LED 136 may be warm white light LED, and the second LED 138 may be white light (or cool white light) LED. In some embodiments, the color temperature of the first LED 136 may be in a range from 2500K to 3500K, and the color temperature of the second LED 138 may be in a range from 5500K to 6500K. The light-emitting module 130 may emit light with the color temperature in a range from 2700K to 6500K.

In the following description, the structure and circuit design of the single button color-adjustable and dimmable LED lighting device 100 will be explained.

Figure 2:
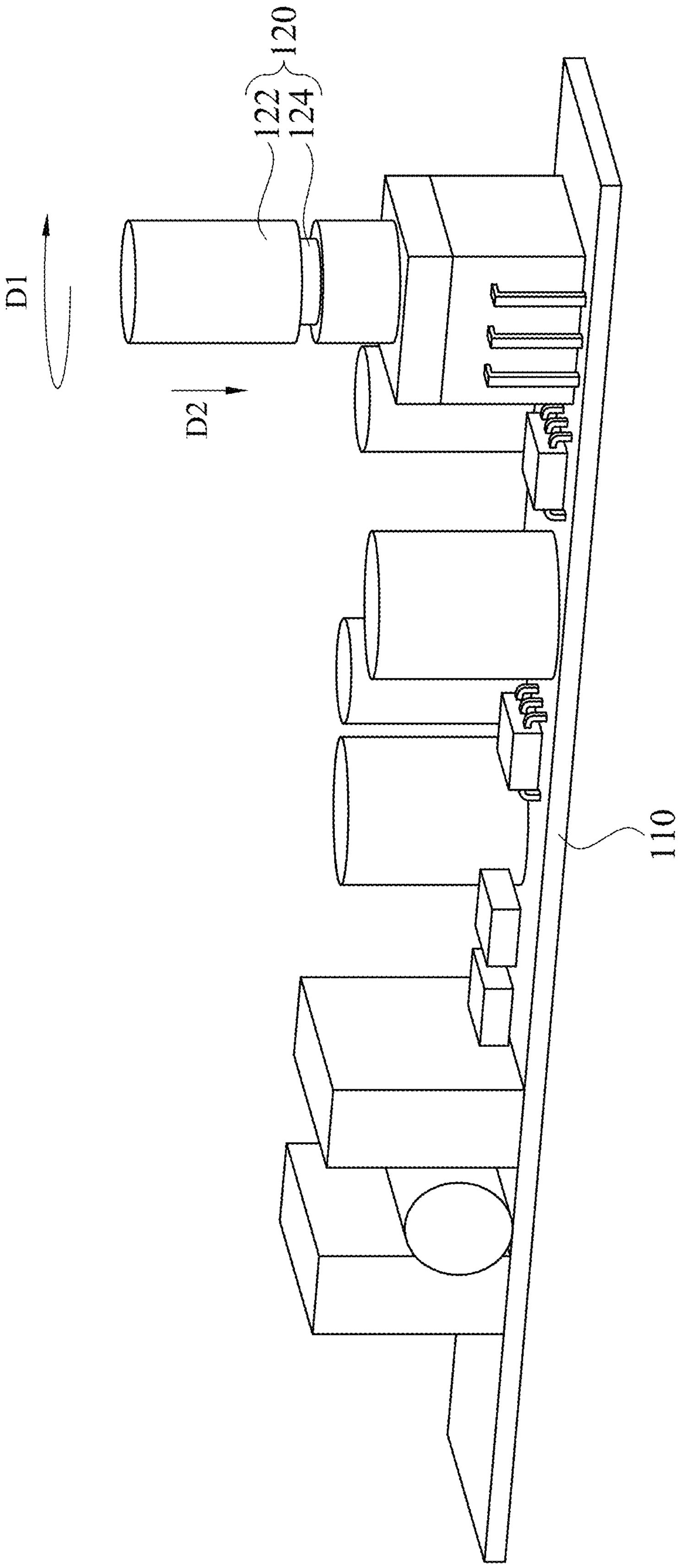
FIG. 2 is a perspective view of a control board and a button knob assembly of FIG. 1.
Figure 3:
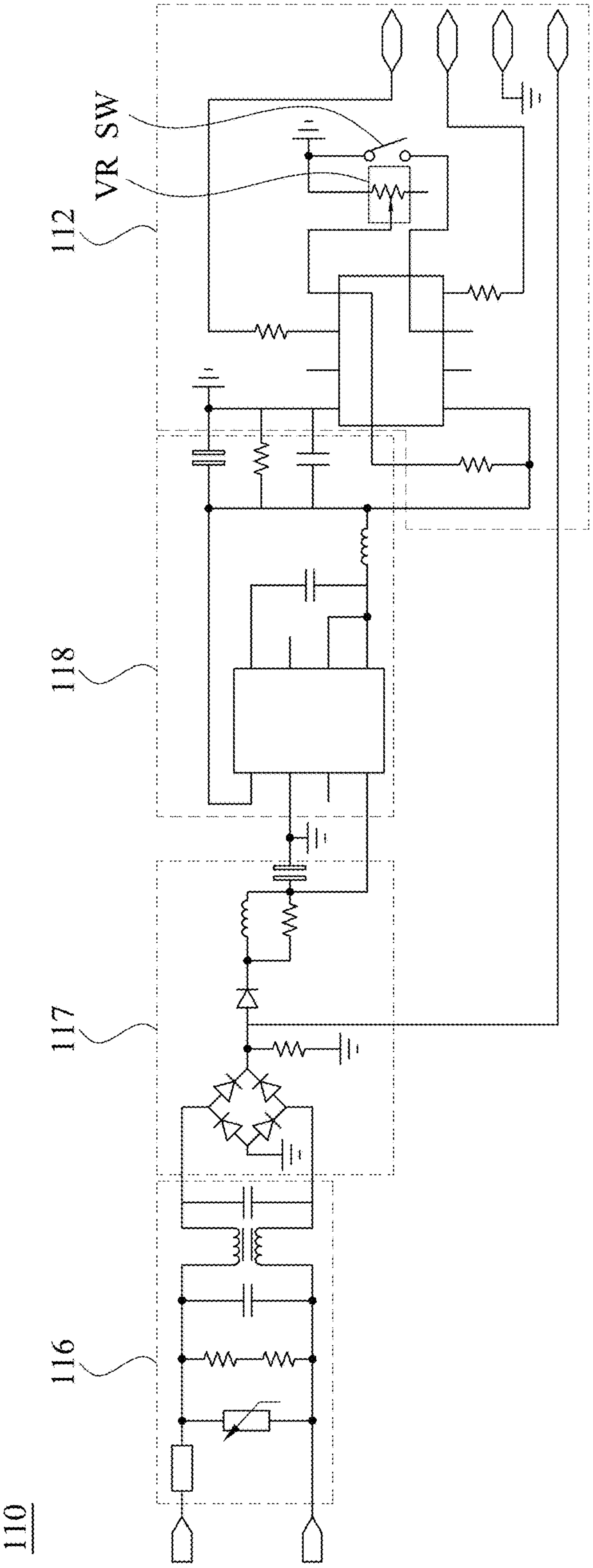
FIG. 3 is a circuit diagram of the control board of FIG. 1.

FIG. 2 is a perspective view of the control board 110 and the button knob assembly 120 of FIG. 1. FIG. 3 is a circuit diagram of the control board 110 of FIG. 1. As shown in FIG. 2 and FIG. 3, the button knob assembly 120 includes a knob 122 and a rotary shaft 124. The MCU control circuit 112 has a variable resistor VR and a switch SW. The rotary shaft 124 is connected to the variable resistor VR and the switch SW. The knob 122 is fixed to the rotary shaft 124, allows fingers to rotate in a direction D1 or an opposite direction of the direction D1, and allows fingers to press in a direction D2 or pull out in an opposite direction of the direction D2 (i.e., upward). When the knob 122 rotates the rotary shaft 124 (e.g., in the direction D1), the rotary shaft 124 can enable the knob 122 to continuously rotate through the design of the variable resistor VR, not to turn one step at a time. In other words, the knob 122 adjusts the resistance value of the variable resistor VR by stepless rotation. The direction D2 in which the knob 122 is pressed (or the direction in which the knob 122 is pulled out) is the axial direction of the rotary shaft 124, and is also the normal direction of the control board 110. Pressing (or pulling out) the knob 122 can change the state of the switch SW (e.g., the knob 122 is pressed (or pulled out) to close the switch SW). For example, when the knob 122 is clicked briefly (or pulled out briefly), the MCU control circuit 112 may change the light-emitting module 130 from a light-off state to a light-on state, or from a light-on state to a light-off state. In another embodiment, when the knob 122 is pressed continuously or pulled out continuously, the MCU control circuit 112 may change the light-emitting module 130 from a light-off state to a light-on state, or from a light-on state to a light-off state. Moreover, in this embodiment, the switch SW is in a first state when the knob 122 is clicked briefly (or pulled out briefly), or the switch SW is in a second state when the knob 122 is pressed continuously (or pulled out continuously).

As shown in FIG. 1 and FIG. 3, the control board 110 may further include an electromagnetic interference (EMI) protection circuit 116, a rectifier filter circuit 117, and a DC constant voltage power supply circuit 118. The EMI protection circuit 116 is electrically connected to a power source 200 (e.g., utility power), and has anti-pulse and anti-lightning functions. The rectifier filter circuit 117 is electrically connected to the EMI protection circuit 116, the first PWM control constant current circuit 132, and the second PWM control constant current circuit 134. The DC constant voltage power supply circuit 118 is electrically connected to the rectifier filter circuit 117 and the MCU control circuit 112. Furthermore, in some embodiments, a state of the light-emitting module 130 before power is off can be memorized by the MCU control circuit 112. When power is supplied next time, the MCU control circuit 112 can restore the state of the light-emitting module 130 before power is off, thereby realizing the function of power-off memory.

Figure 4:
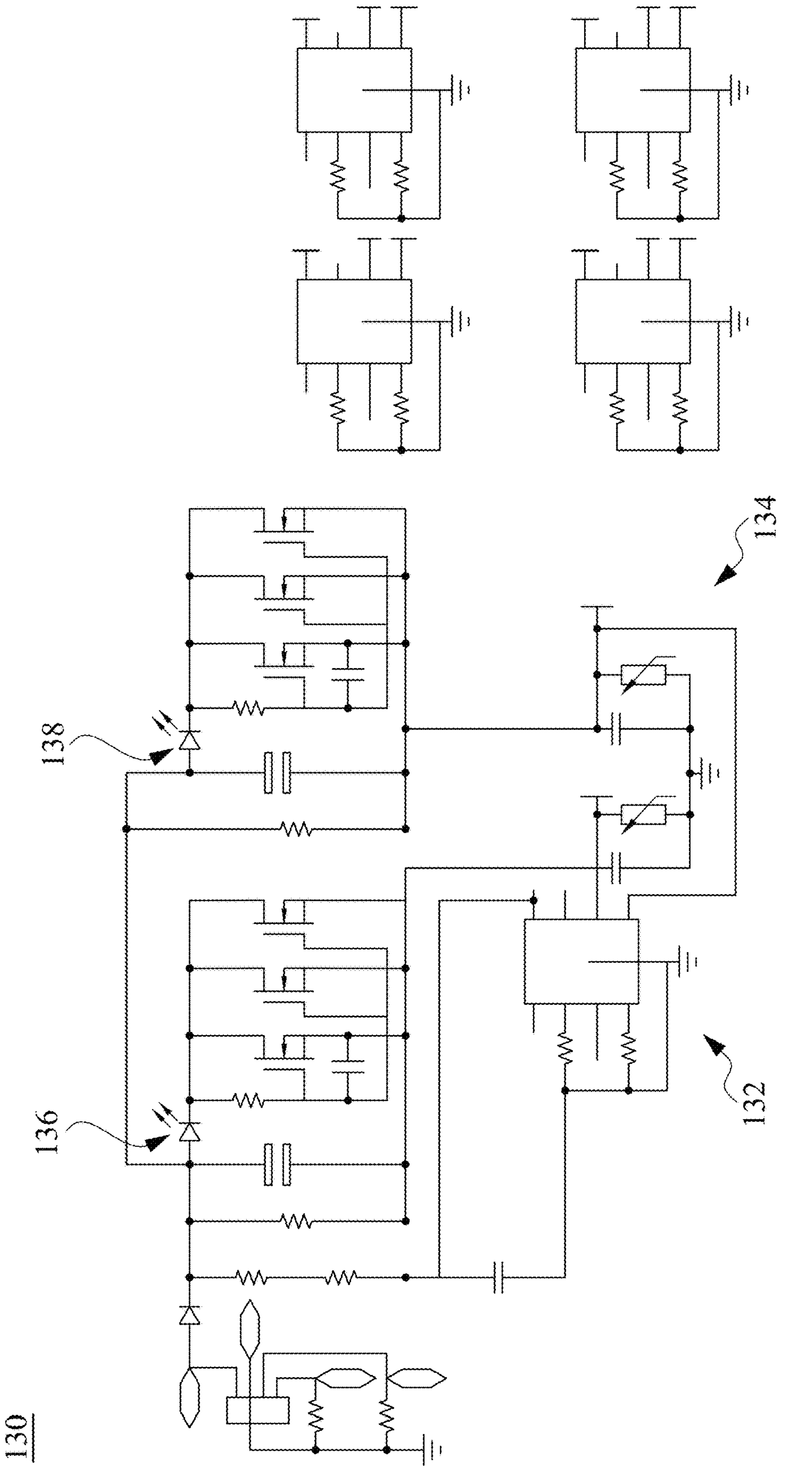
FIG. 4 is a circuit diagram of a light-emitting module of FIG. 1.

FIG. 4 is a circuit diagram of the light-emitting module 130 of FIG. 1. The contacts at the left side of the light-emitting module 130 of FIG. 4 are electrically connected to the contacts at the right side of the control board 110 of FIG. 3. The first PWM control constant current circuit 132 and the second PWM control constant current circuit 134 may connect plural constant current integrated circuits (ICs) in parallel.

Figure 5A:
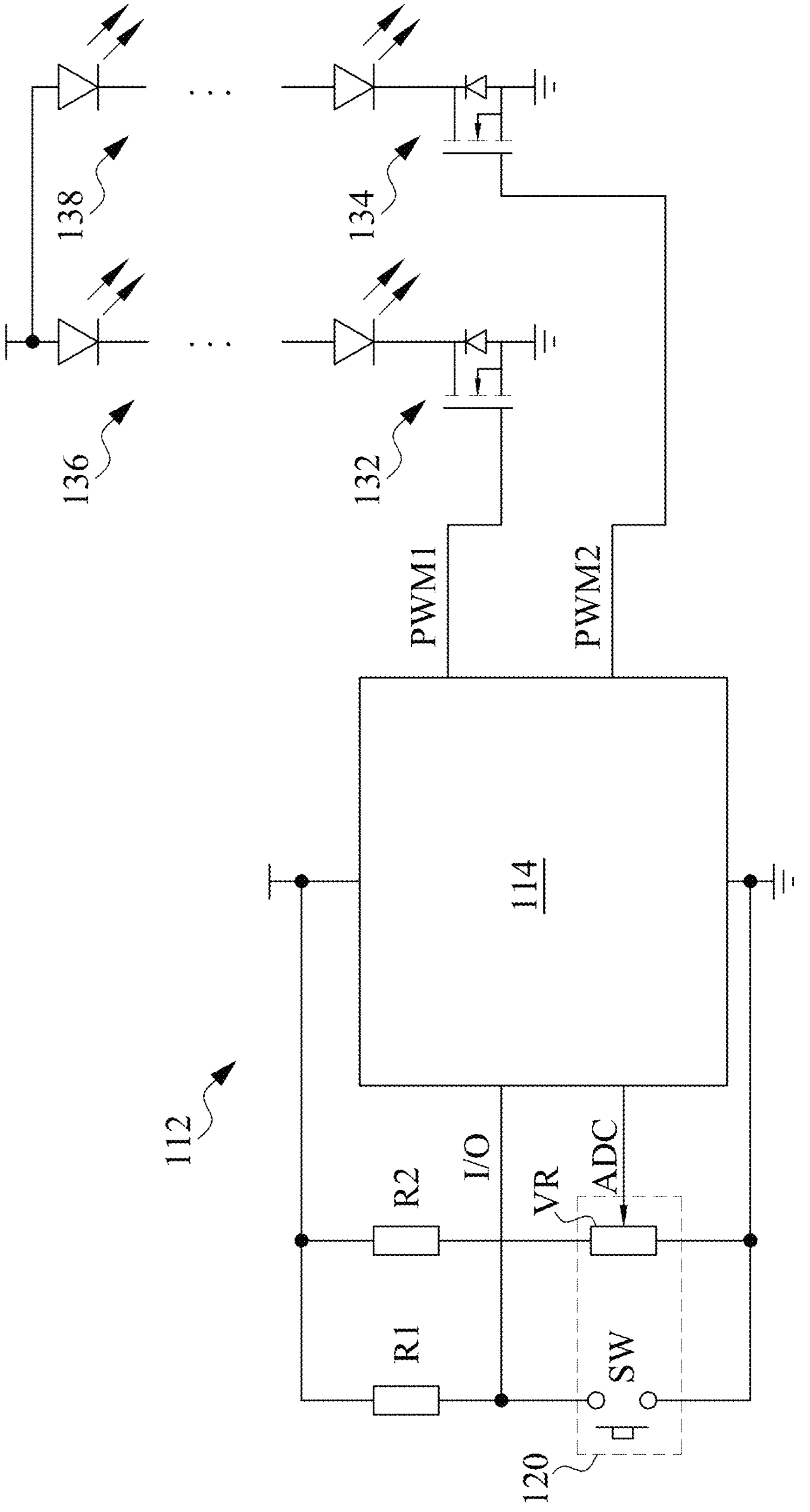
FIG. 5A is a circuit diagram of a microcontroller unit (MCU) control circuit, a first pulse-width modulation (PWM) control constant current circuit, a second PWM control constant current circuit, a first LED, and a second LED of FIG. 1.
Figure 5B:
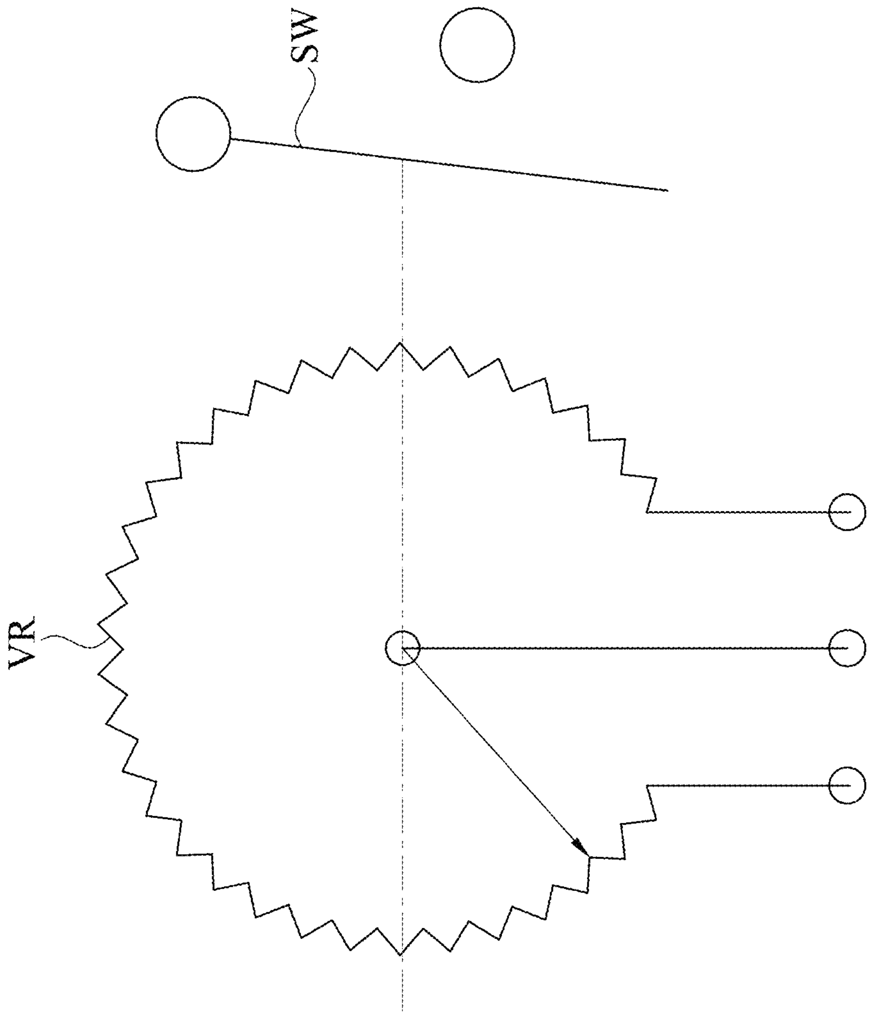
FIG. 5B is an enlarged view of a switch and a variable resistor of FIG. 5A.

FIG. 5A is a circuit diagram of the MCU control circuit 112, the first PWM control constant current circuit 132, the second PWM control constant current circuit 134, the first LED 136, and the second LED 138 of FIG. 1. FIG. 5B is an enlarged view of the switch SW and the variable resistor VR of FIG. 5A. As shown in FIG. 5A and FIG. 5B, a microcontroller unit (MCU) 114 may receive an input/output signal I/O, and may utilize analog to digital conversion function to read the resistance value of the variable resistor VR based on an analog to digital conversion signal ADC, and match whether the switch SW is pressed (i.e., whether the knob 122 of FIG. 2 connected to the switch SW is pressed or pulled out) to determine whether the change in resistance at this time is to adjust brightness or color temperature, and sends corresponding pulse-width modulation (PWM) signals PWM1 and PWM2. The variable resistor VR designed above only needs to occupy two pins of the MCU 114, while a conventional rotary encoder needs to occupy three pins of a MCU. In addition, because the resistance value of the variable resistor VR is directly related to the rotation position of the knob 122, the user can clearly know the current state of the lighting device, such as whether the brightness is at the brightest or darkest position.

Figure 5C:
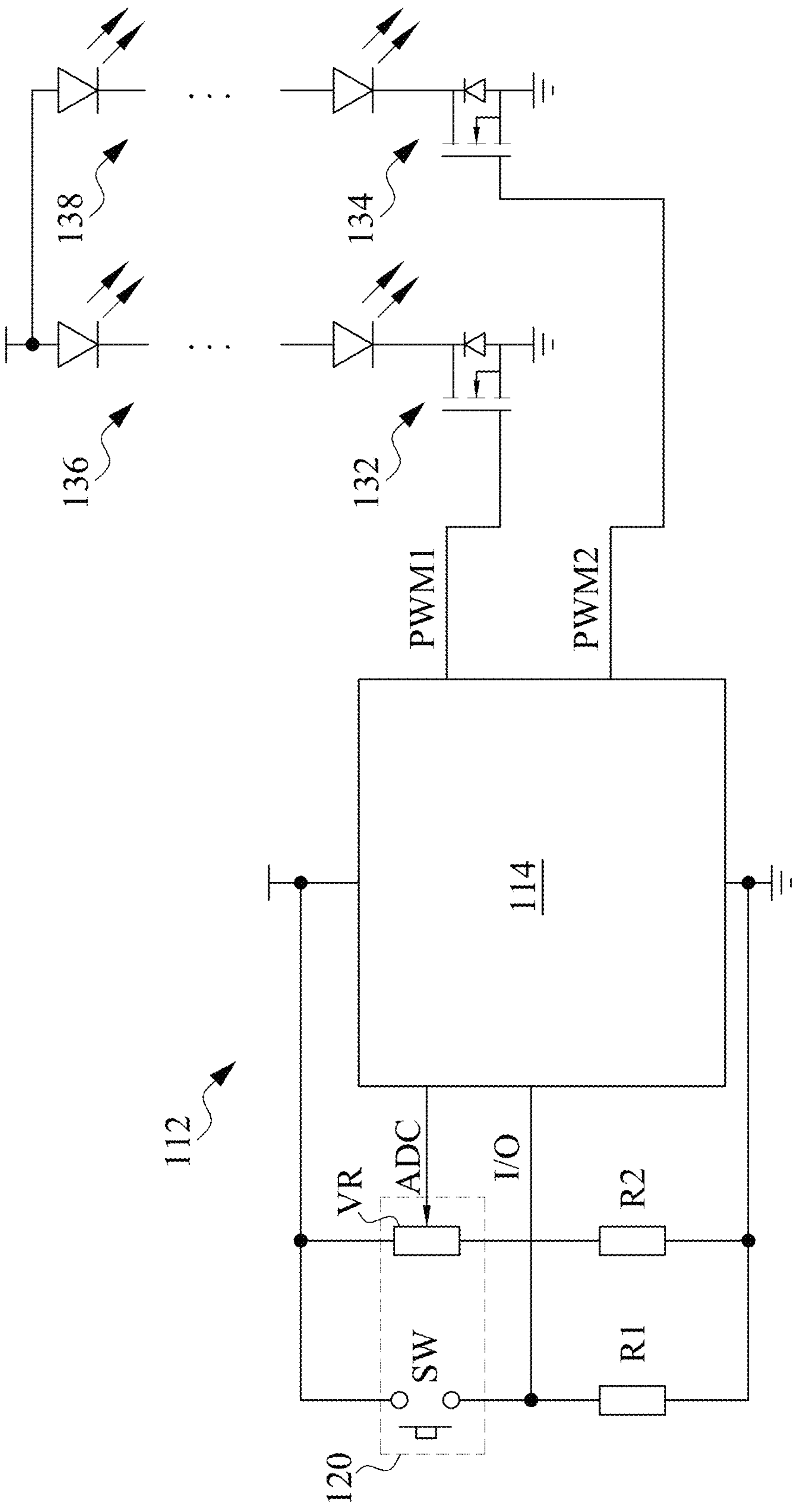
FIG. 5C is another embodiment different from FIG. 5A.

FIG. 5C is another embodiment different from FIG. 5A. The difference between this embodiment and the embodiment of FIG. 5A is that the positions of resistors R1 and R2 are exchanged with the positions of the switch SW and the variable resistor VR. In other words, the resistors R1 and R2 of FIG. 5A is disposed above, and the resistors R1 and R2 of FIG. 5C is disposed below. Moreover, the resistors R1 and R2 of FIG. 5C may also be selectively replaced with resistors built in the MCU 114.

As shown in FIG. 2 and FIG. 5A, in some embodiments, as shown in Table 1 below, when the knob 122 is not pressed (or pulled out), the switch SW is not pressed so as to be open, and the knob 122 is rotated in a clockwise direction D1 such that the resistance value of the variable resistor VR in increased, thereby increasing the brightness of the lighting device; when the switch SW is not pressed and the knob 122 is rotated in a counterclockwise direction (the opposite direction of the direction D1), the resistance value of the variable resistor VR is decreased, thereby decreasing the brightness of the lighting device. When the knob 122 is pressed (or pulled out), the switch SW is pressed so as to be closed, and the knob 122 can be rotated in the clockwise direction D1 at the same time such that the resistance value of the variable resistor VR is increased, thereby increasing the color temperature of the lighting device; when the switch SW is pressed and the knob 122 is rotated in the counterclockwise direction (the opposite direction of the direction D1) at the same time, the resistance value of the variable resistor VR is decreased, thereby decreasing the color temperature of the lighting device. The operation conditions may also refer to FIG. 9B and FIG. 9C.

TABLE 1

| | Change in resistance value of knob | |
|---|---|---|
| Switch state of knob | Increased resistance value | Decreased resistance value |
| Not be pressed | Increased brightness | Decreased brightness |
| Pressed | Increased color temperature | Decreased color temperature |

In another embodiment, when the knob 122 is not pressed (or pulled out), the switch SW is not pressed so as to be open, and the knob 122 is rotated in the clockwise direction D1 such that the resistance value of the variable resistor VR in increased, thereby increasing the color temperature of the lighting device; when the switch SW is not pressed and the knob 122 is rotated in the counterclockwise direction (the opposite direction of the direction D1), the resistance value of the variable resistor VR is decreased, thereby decreasing the color temperature of the lighting device. When the knob 122 is pressed (or pulled out), the switch SW is pressed so as to be closed, and the knob 122 can be rotated in the clockwise direction D1 at the same time such that the resistance value of the variable resistor VR is increased, thereby increasing the brightness of the lighting device; when the switch SW is pressed and the knob 122 is rotated in the counterclockwise direction (the opposite direction of the direction D1) at the same time, the resistance value of the variable resistor VR is decreased, thereby decreasing the brightness of the lighting device.

Figure 6:
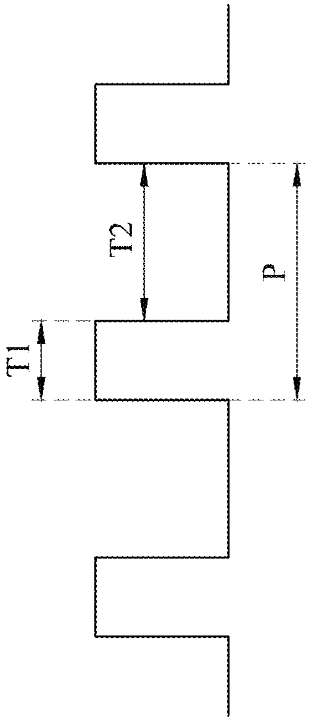
FIG. 6 is a schematic view of a pulse-width modulation signal of the light-emitting module according to one embodiment of the present disclosure.

FIG. 6 is a schematic view of a pulse-width modulation signal of the light-emitting module 130 (see FIG. 1) according to one embodiment of the present disclosure. As shown in FIG. 1 and FIG. 6, a pulse wave has a period P including a pulse-on time T1 and a pulse-off time T2. Pulse-width modulation may adjust an output current for the first LED 136 and an output current for the second LED 138 through adjusting the pulse-on time T1. The longer the pulse-on time T1, the greater the output currents for the first LED 136 and the second LED 138, that is, the higher the brightness. On the contrary, the shorter the pulse-on time T1, the smaller output currents for the first LED 136 and the second LED 138, that is, the lower the brightness.

Referring back to FIG. 1 and FIG. 3, the MCU control circuit 112 can generate two corresponding PWM signals based on the resistance value of the variable resistor VR and the state of the switch SW to respectively control the output current for the first LED 136 and the output current for the second LED 138, such that the light-emitting module 130 emits light with different brightness or different color temperatures. In some embodiments, the resistance value of the variable resistor VR may be adjusted in a range from 0 to half a power supply voltage of circuit (Vcc/2), the brightness of the light-emitting module 130 may be adjusted in a range from 0 to 100%, and the color temperature of the light-emitting module 130 may be adjusted in a range from 3000K to 6000K. In the following description, the operating mechanism of using the aforementioned single button knob assembly 120 to adjust the pulse-on time to adjust the brightness and color temperature of the light-emitting module 130.

FIGS. 7A to 8C are schematic views of the pulse-width modulation signals of the light-emitting module 130 (see FIG. 1) according to some embodiments of the present disclosure, in which a pulse-width modulation signal L1 is the pulse wave of the first LED 136 (e.g., the color temperature 3000K), and a pulse-width modulation signal L2 is the pulse wave of the second LED 138 (e.g., the color temperature 6000K).

Figure 8A:
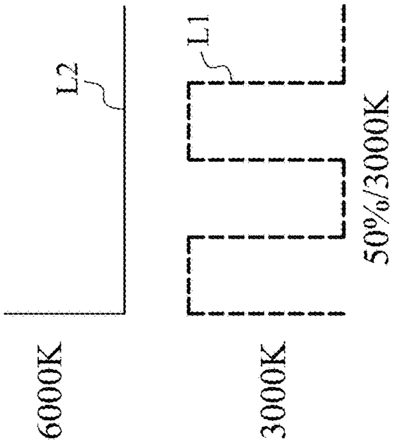
Figure 8B:
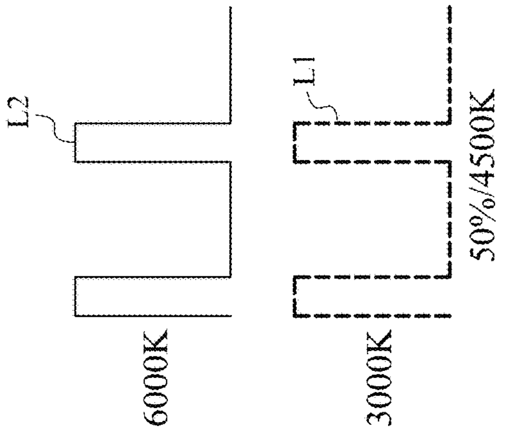
Figure 8C:
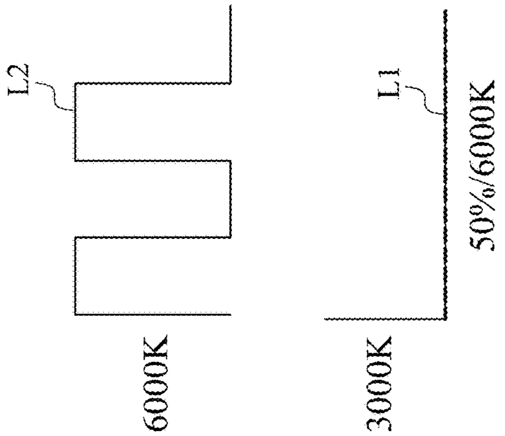
Figure 9C:
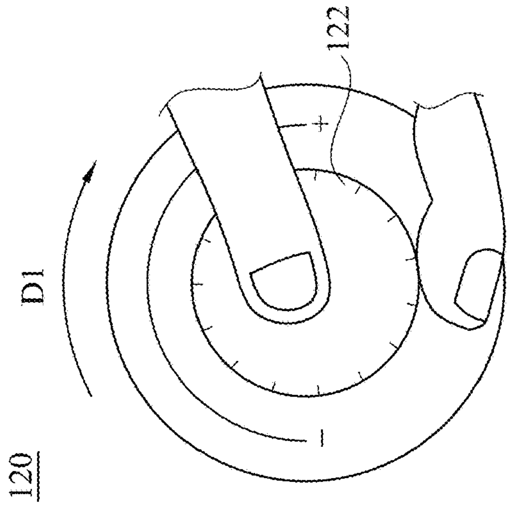
FIGS. 9A to 9C are top views of the button knob assembly when being in operation according to some embodiments of the present disclosure.
Figure 9B:
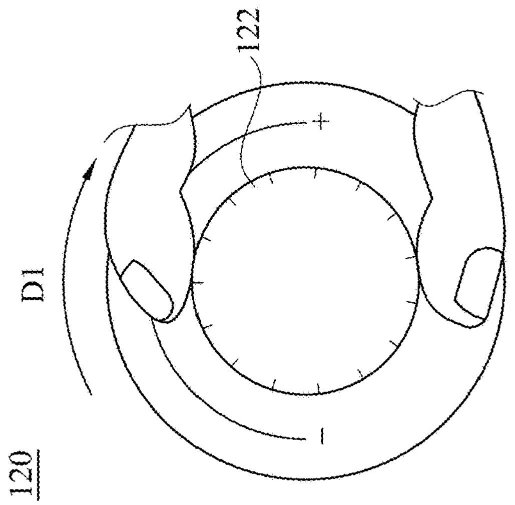
Figure 9A:
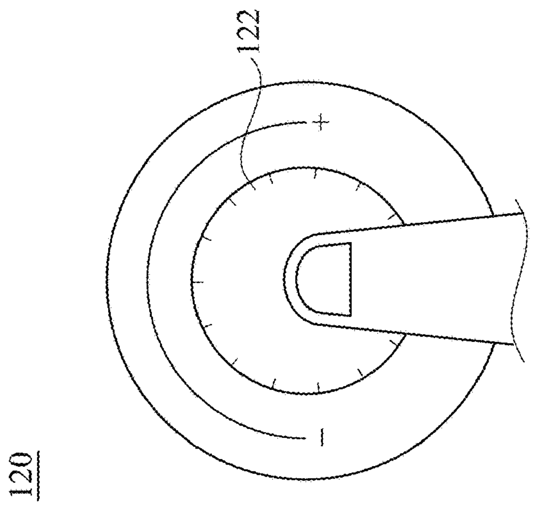

FIGS. 9A to 9C are top views of the button knob assembly 120 when being in operation according to some embodiments of the present disclosure. When the knob 122 rotates the underlying rotary shaft 124 (see FIG. 2), the rotary shaft 124 adjusts the resistance value of the variable resistor VR (see FIG. 3) by stepless rotating the knob 122 in an angle range from 0 degree to 180 degrees through the variable resistor VR. For example, the angle range is from the "−" position at the left side of the knob 122 by half a turn to the "+" position at the right side. When turning the light on or off, as shown in FIG. 3 and FIG. 9A, the knob 122 may be clicked briefly (or pulled out briefly), and the MCU control circuit 112 detects the change of the state of the switch SW, such that the first LED 136 and the second LED 138 of the light-emitting module 130 change from the light-off state to the light-on state or change from the light-on state to the light-off state based on the current light-off or light-on state of the first LED 136 and the second LED 138. For example, the aforementioned light-on state may be the pulse-width modulation signal L1 of the first LED 136 and the pulse-width modulation signal L2 of the second LED 138 provided in any one of FIG. 7A to FIG. 8C.

When the first LED 136 and the second LED 138 are in the light-on state and the brightness needs to be adjusted (dimming brightness), as shown in FIG. 9B, the knob 122 may be only rotated and not be pressed (or pulled out), and the switch SW (see FIG. 3) is in the first state (e.g., the switch SW is open) at this moment. When the knob 122 is rotated, the resistance value of the variable resistor VR (see FIG. 3) is changed, and the two PWM signals can adjust the brightness of the entirety of the first LED 136 (see FIG. 1) and the second LED 138 (see FIG. 1). For example, when the knob 122 is rotated in the direction D1, the two PWM signals L1 and L2 of FIG. 8B respectively adjust the pulse-on time to the two PWM signals L1 and L2 of FIG. 7B, thereby increasing the output current for the first LED 136 and the output current for the second LED 138 (e.g., from 50% to 100%) and unchanging the color temperature (e.g., 4500K). On the contrary, when the knob 122 is rotated in the opposite direction of the direction D1, the two PWM signals L1 and L2 of FIG. 7B respectively adjust the pulse-on time to the two PWM signals L1 and L2 of FIG. 8B, thereby decreasing the output current for the first LED 136 and the output current for the second LED 138. As a result, the brightness of the light emitted by the light-emitting module 130 (see FIG. 1) can be changed.

In another embodiment, when the first LED 136 and the second LED 138 are in the light-on state and the brightness needs to be adjusted (dimming brightness), as shown in FIG. 9C, the knob 122 may be pressed continuously (or pulled out continuously) and rotated at the same time, and the switch SW (see FIG. 3) is in the second state (e.g., the switch SW is closed) at this moment. When the knob 122 is pressed to rotate, the resistance value of the variable resistor VR (see FIG. 3) is changed, and the two PWM signals can adjust the brightness of the entirety of the first LED 136 (see FIG. 1) and the second LED 138 (see FIG. 1).

Figure 7A:
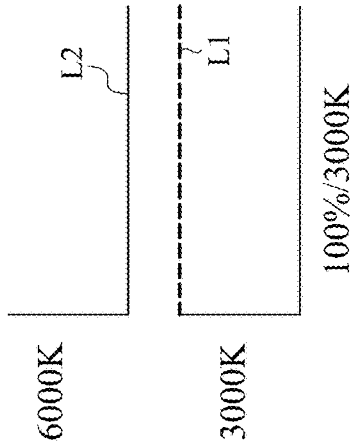
FIGS. 7A to 8C are schematic views of pulse-width modulation signals of the light-emitting module according to some embodiments of the present disclosure.
Figure 7B:
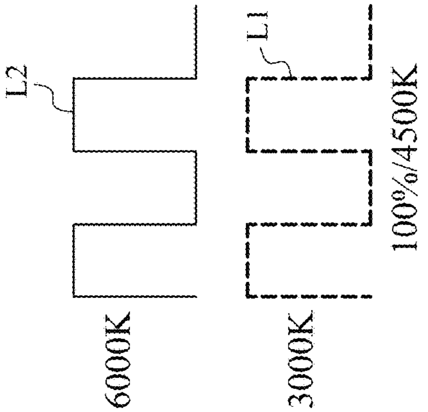
Figure 7C:
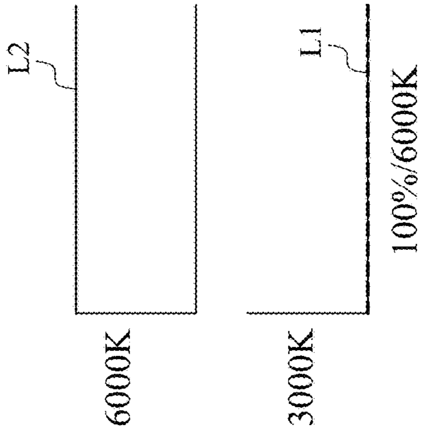

It is to be noted that the adjustments of the PWM signals L1 and L2 between FIG. 8A and FIG. 7A and the adjustments of the PWM signals L1 and L2 between FIG. 8C and FIG. 7C are similar to the aforementioned operating mechanism, and will not be repeated again.

When the first LED 136 and the second LED 138 are in the light-on state and the color temperature needs to be adjusted (dimming color), as shown in FIG. 9C, the knob 122 may be pressed continuously (or pulled out continuously) and rotated at the same time, and the switch SW (see FIG. 3) is in the second state (e.g., the switch SW is closed) at this moment. When the knob 122 is pressed to rotate, the resistance value of the variable resistor VR (see FIG. 3) is changed, and the two PWM signals can adjust the color temperature of the entirety of the first LED 136 (see FIG. 1) and the second LED 138 (see FIG. 1). For example, when the knob 122 is pressed continuously (or pulled out continuously) and rotated in the direction D1, the two PWM signals L1 and L2 of FIG. 7A respectively adjust the pulse-on time to the two PWM signals L1 and L2 of FIG. 7B, thereby changing the output current for the first LED 136 and the output current for the second LED 138, such as decreasing the output current for the first LED 136 but increasing the output current for the second LED 138 to increase the color temperature from 3000K to 4000K. On the contrary, when the knob 122 is pressed continuously (or pulled out continuously) and rotated in the opposite direction of the direction D1, the two PWM signals L1 and L2 of FIG. 7B respectively adjust the pulse-on time to the two PWM signals L1 and L2 of FIG. 8A, thereby increasing the output current for the first LED 136 but decreasing the output current for the second LED 138. As a result, the color temperature of the light emitted by the light-emitting module 130 (see FIG. 1) can be changed.

In another embodiment, when the first LED 136 and the second LED 138 are in the light-on state and the color temperature needs to be adjusted (dimming color), as shown in FIG. 9B, the knob 122 may be only rotated and not be pressed (or pulled out), and the switch SW (see FIG. 3) is in the first state (e.g., the switch SW is open) at this moment. When the knob 122 is rotated, the resistance value of the variable resistor VR (see FIG. 3) is changed, and the two PWM signals can adjust the color temperature of the entirety of the first LED 136 (see FIG. 1) and the second LED 138 (see FIG. 1).

It is to be noted that the adjustments of the PWM signals L1 and L2 between FIG. 7B and FIG. 7C and the adjustments of the PWM signals L1 and L2 between FIG. 8A and FIG. 8B are similar to the aforementioned operating mechanism, and will not be repeated again.

The aforementioned method for adjusting the color temperature (or the brightness) may be performed by pressing the knob 122 continuously and rotating the knob 122 at the same time, and clicking the knob 122 briefly is performed to turn lights on or off. In another embodiment, turning lights on or off may be performed by pressing the knob 122 continuously, and adjusting the color temperature or the brightness may be performed by clicking the knob 122 briefly and rotating the knob 122.

To sum up, since the single button color-adjustable and dimmable LED lighting device has the button knob assembly disposed on the control board, and the MCU control circuit has the variable resistor and the switch, and the light-emitting module has the first PWM control constant current circuit electrically connected to the MCU control circuit and the first LED and has the second PWM control constant current circuit electrically connected to the MCU control circuit and the second LED, the user can operate the button knob assembly to enable the MCU control circuit to generate two corresponding PWM signals based on the resistance value of the variable resistor and the state of the switch when the single button color-adjustable and dimmable LED lighting device is in use. As a result, the output current passing through the first LED and the output current passing through the second LED can be controlled to realize the adjustments of the brightness and the color temperature of the light-emitting module.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A single button color-adjustable and dimmable LED lighting device, comprising:

- a control board having a microcontroller unit (MCU) control circuit, wherein the MCU control circuit has a variable resistor and a switch;
- a button knob assembly disposed on the control board and electrically connected to the MCU control circuit; and
- a light-emitting module having a first pulse-width modulation (PWM) control constant current circuit, a second PWM control constant current circuit, a first light-emitting diode (LED), and a second LED, wherein the first PWM control constant current circuit is electrically connected to the MCU control circuit and the first LED, the second PWM control constant current circuit is electrically connected to the MCU control circuit and the second LED, a color temperature of the first LED is different from a color temperature of the second LED, and the MCU control circuit is configured to generate two corresponding PWM signals based on a resistance value of the variable resistor and a state of the switch to respectively control an output current for the first LED and an output current for the second LED, such that the light-emitting module emits light with different brightness or different color temperatures.

2. The single button color-adjustable and dimmable LED lighting device of claim 1, wherein the button knob assembly comprises:

- a rotary shaft connected to the variable resistor and the switch; and
- a knob fixed to the rotary shaft, configured to be pressed or pulled out, and configured to rotate, wherein the switch is in a first state when the knob is clicked briefly or pulled out briefly, or the switch is in a second state when the knob is pressed continuously or pulled out continuously.

3. The single button color-adjustable and dimmable LED lighting device of claim 2, wherein when the switch is in the first state and the knob is rotated, the two PWM signals are configured to adjust brightness of an entirety of the first LED and the second LED.

4. The single button color-adjustable and dimmable LED lighting device of claim 2, wherein when the switch is in the second state and the knob is rotated, the two PWM signals are configured to adjust brightness of an entirety of the first LED and the second LED.

5. The single button color-adjustable and dimmable LED lighting device of claim 2, wherein when the switch is in the second state and the knob is rotated, the two PWM signals are configured to adjust a color temperature of an entirety of the first LED and the second LED.

6. The single button color-adjustable and dimmable LED lighting device of claim 2, wherein when the switch is in the first state and the knob is rotated, the two PWM signals are configured to adjust a color temperature of an entirety of the first LED and the second LED.

7. The single button color-adjustable and dimmable LED lighting device of claim 2, wherein when the knob is clicked briefly or pulled out briefly, the MCU control circuit is configured to change the light-emitting module from a light-on state to a light-off state, or from a light-off state to a light-on state.

8. The single button color-adjustable and dimmable LED lighting device of claim 2, wherein when the knob is pressed continuously or pulled out continuously, the MCU control circuit is configured to change the light-emitting module from a light-on state to a light-off state, or from a light-off state to a light-on state.

9. The single button color-adjustable and dimmable LED lighting device of claim 1, wherein the two PWM signals are configured to adjust pulse-on time to increase or decrease the output current for the first LED and the output current for the second LED, thereby changing brightness of light emitted from the light-emitting module.

10. The single button color-adjustable and dimmable LED lighting device of claim 1, wherein the two PWM signals are configured to adjust pulse-on time to change the output current for the first LED and the output current for the second LED, thereby changing a color temperature of light emitted from the light-emitting module.

11. The single button color-adjustable and dimmable LED lighting device of claim 1, wherein a color temperature of the first LED is in a range from 2500K to 3500K, and a color temperature of the second LED is in a range from 5500K to 6500K.

12. The single button color-adjustable and dimmable LED lighting device of claim 1, wherein the light-emitting module is configured to emit light with a color temperature in a range from 2700K to 6500K.

13. The single button color-adjustable and dimmable LED lighting device of claim 1, wherein the control board further comprises:

an electromagnetic interference (EMI) protection circuit electrically connected to a power source;

a rectifier filter circuit electrically connected to the EMI protection circuit, the first PWM control constant current circuit, and the second PWM control constant current circuit; and a DC constant voltage power supply circuit electrically connected to the rectifier filter circuit and the MCU control circuit.

14. The single button color-adjustable and dimmable LED lighting device of claim 1, wherein the MCU control circuit is configured to memorize and restore a state of the light-emitting module before power is off.

15. A single button color-adjustable and dimmable LED lighting device, comprising:

a control board having a microcontroller unit (MCU) control circuit, wherein the MCU control circuit has a variable resistor and a switch;

a button knob assembly disposed on the control board and electrically connected to the MCU control circuit, and comprising:

a rotary shaft connected to the variable resistor and the switch; and a knob fixed to the rotary shaft, configured to be pressed or pulled out, and configured to rotate, wherein when the knob rotates the rotary shaft, the rotary shaft is configured to continuously rotate the knob in an angle range by the variable resistor to adjust a resistance of the variable resistor; and a light-emitting module having a first pulse-width modulation (PWM) control constant current circuit, a second PWM control constant current circuit, a first light-emitting diode (LED), and a second LED, wherein the first PWM control constant current circuit is electrically connected to the MCU control circuit and the first LED, and the second PWM control constant current circuit is electrically connected to the MCU control circuit and the second LED.

* * * * *